April 23, 1946.  H. E. CARNAGUA ET AL  2,399,098
TRANSMISSION
Filed June 26, 1943  4 Sheets-Sheet 1
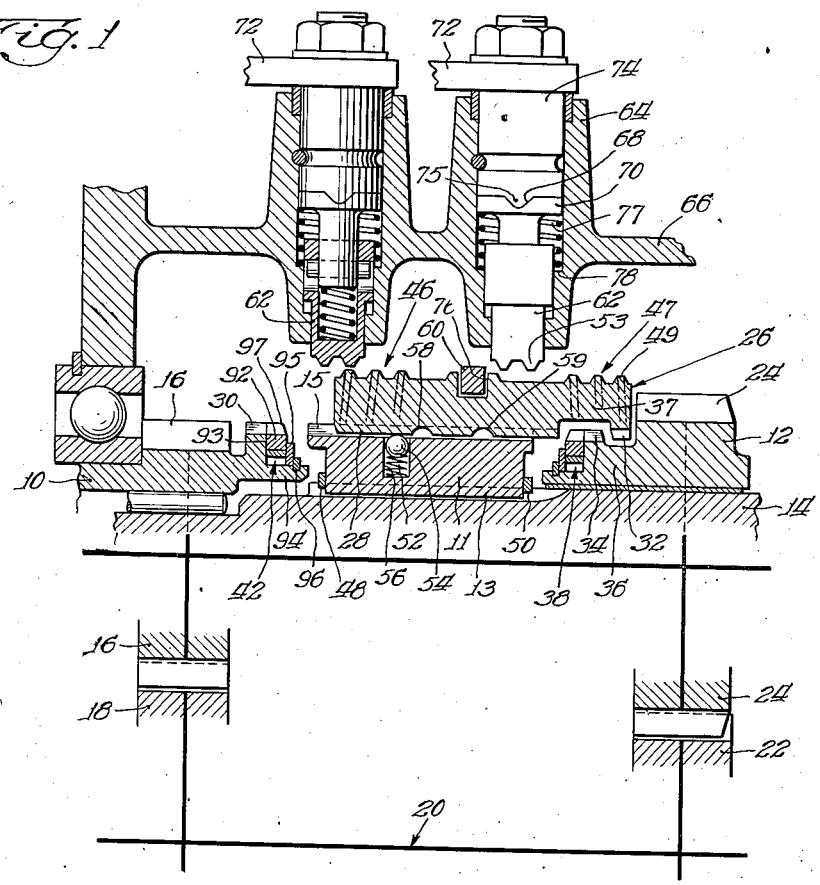
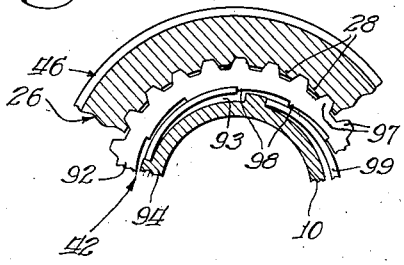
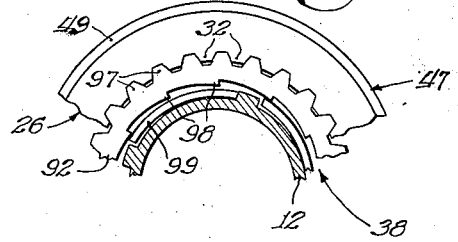
Inventors:
Harold E. Carnagua
Clifford L. Swift
By: Edward C. Fitzbaugh
Atty.

April 23, 1946.    H. E. CARNAGUA ET AL    2,399,098
TRANSMISSION
Filed June 26, 1943    4 Sheets-Sheet 2

Inventors:
Harold E. Carnagua
Clifford L. Swift
By: Edward C. Gritzbaugh
Atty.

April 23, 1946.   H. E. CARNAGUA ET AL   2,399,098
TRANSMISSION
Filed June 26, 1943   4 Sheets-Sheet 3
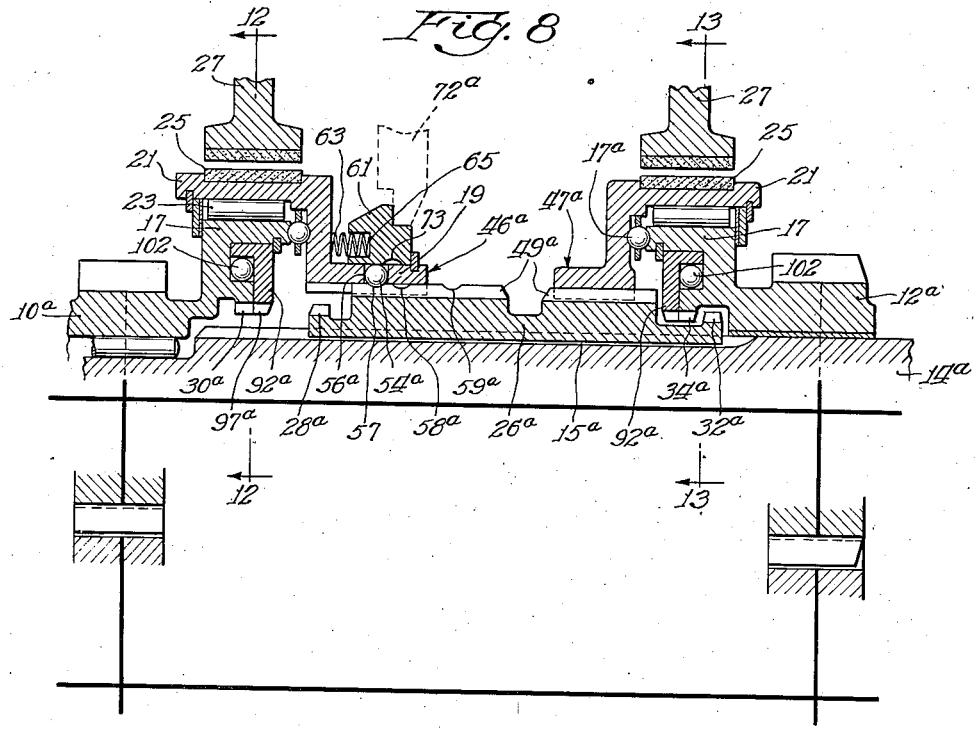
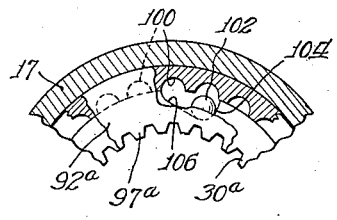
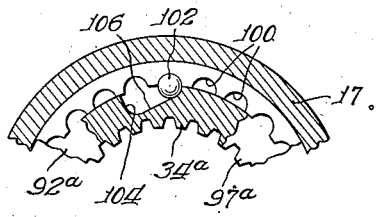
Inventors:
Harold E. Carnagua
Clifford L. Swift
By: Edward C. Fitzhugh
Atty.

April 23, 1946.   H. E. CARNAGUA ET AL   2,399,098
TRANSMISSION
Filed June 26, 1943   4 Sheets-Sheet 4
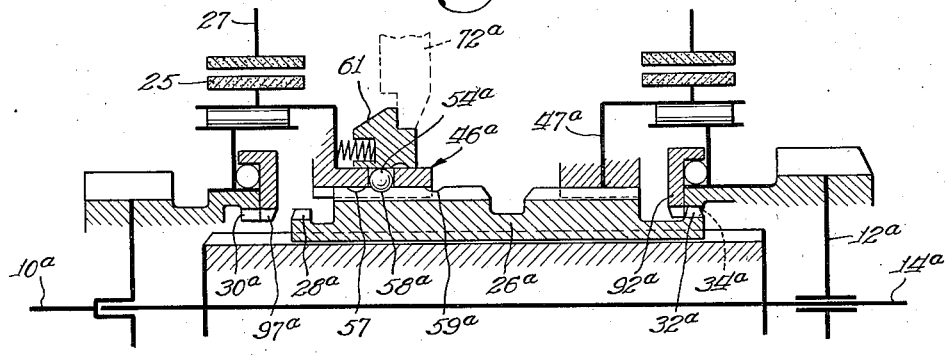
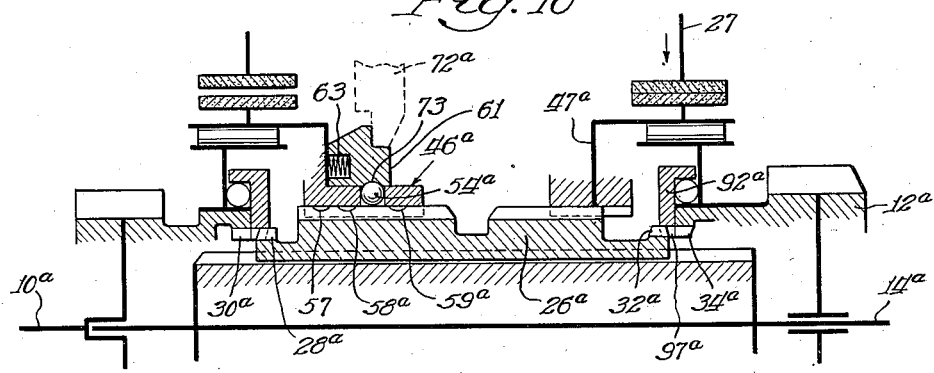
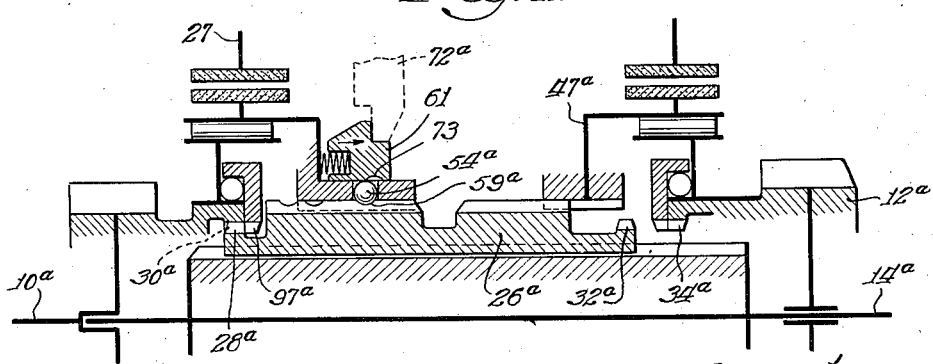
Inventors:
Harold E. Carnagua
Clifford L. Swift
By: Edward C. Fitzbaugh
Atty.

Patented Apr. 23, 1946

2,399,098

UNITED STATES PATENT OFFICE 2,399,098

TRANSMISSION

Harold E. Carnagua and Clifford L. Swift, Muncie, Ind., assignors to Borg-Warner Corporation, Chicago, Ill., a corporation of Illinois Application June 26, 1943, Serial No. 492,379

8 Claims. (Cl. 192—53)

This invention relates to coupling devices and has as its general object to provide a positive coupling device adapted to be employed, in connection with suitable controls, for effecting an automatic shift from one gear ratio to another gear ratio in a transmission which may be generally of a conventional type and in which other shifts may be operator energized.

The invention is characterized by the provision of a plurality of independently operable torque responsive means, one for shifting the coupling device toward a coupled position and the other for shifting the coupling device away from such coupled position. The invention is further characterized by the provision of torque responsive means which is not in the line of drive through the coupling mechanism, as distinguished from prior arrangements of a generally similar nature, such as those shown in the companion application of H. E. Carnagua and Clifford L. Swift, identified as Borg-Warner Case No. 4331-W, wherein a torque responsive mechanism does at times form part of the means for transmitting drive through the coupling mechanism, and is therefore dependent, for its direction of operation, upon the direction in which torque is being transmitted through the coupling mechanism, i. e. the direction in which the members of the coupling mechanism tend to rotate relative to each other. It is therefore an object of the present invention to provide a coupling mechanism which is adapted to provide a torque responsive shift without being controlled by the direction in which torque is being transmitted therethrough.

These and other objects and features of this invention will become apparent from the following specification when taken together with the accompanying drawings in which:

Fig. 1 is an axial sectional view of a portion of a change speed transmission embodying the invention, shown in the neutral position;

Fig. 6 is a transverse sectional view of the same taken on the line 6—6 of Fig. 4;

Fig. 7 is a transverse sectional view of the same taken on the line 7—7 of Fig. 4;

Fig. 8 is an axial sectional view of a transmission embodying a modified form of the invention, shown in the neutral position;

Fig. 9 is a schematic view of the same in the second speed position;

Fig. 10 is a schematic view of the same shown in the transition from the second speed position to the direct drive position;

Fig. 11 is a schematic view of the same shown in the direct drive position;

Fig. 12 is a transverse sectional view taken on the line 12—12 of Fig. 8 showing the direct drive synchronizer in the overrunning position; and Fig. 13 is a transverse sectional view taken on the line 13—13 of Fig. 8, showing the second speed synchronizer in the synchronizing position.

Figure 2:
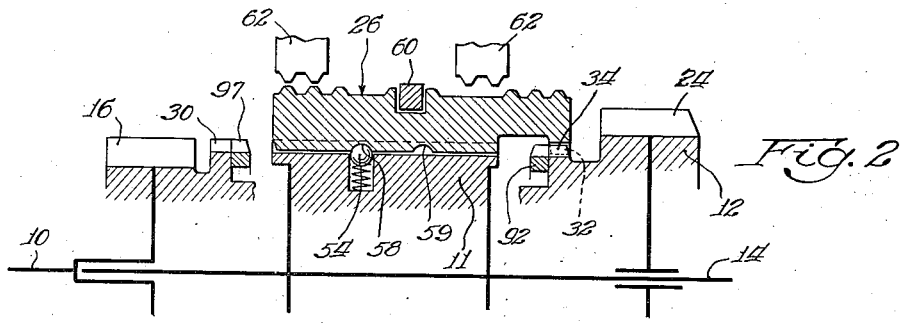
Fig. 2 is a schematic view of the same shown in the second speed position.
Figure 3:
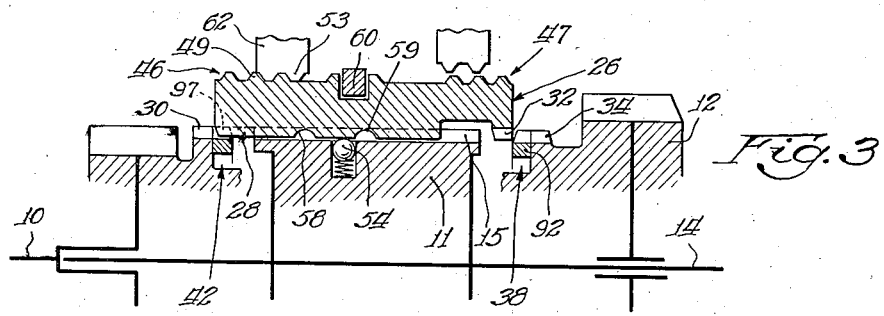
Fig. 3 is a schematic view of the same shown in the transition from second speed to direct drive position.
Figure 4:
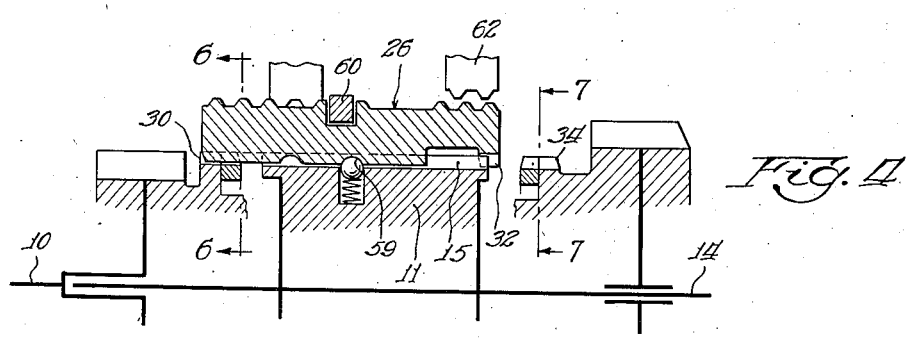
Fig. 4 is a schematic view of the same shown in the direct drive position.
Figure 5:
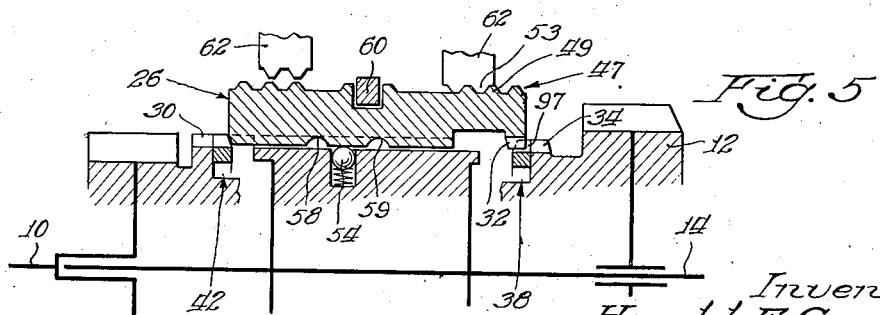
Fig. 5 is a schematic view of the same shown in the transition from direct drive back to the second speed position.

As an example of one form in which the invention may be embodied, we have shown, in Figs. 1 to 7 inclusive, a torque responsive coupling adapted for use in a conventional transmission of the type wherein a drive is adapted to be transmitted from a direct drive member 10 (or a second speed driving member 12) to a driven shaft 14, the second speed member 12 being driven from the member 10 through constant speed gearing including a gear 16 on the drive member 10, a gear 18 meshing with the gear 16 and forming part of a countershaft gear cluster as illustrated schematically at 20, a gear 22 forming part of the gear cluster 20, and a gear 24 on the second speed member 12 and meshing with the gear 22.

The drive is transmitted selectively from either of the drive members 10, 12 to the driven shaft 14 through the medium of a shiftable jaw clutch member 26 carrying jaw clutch teeth 28 adapted to mesh with jaw clutch teeth 30 on the direct drive member 10 and jaw clutch teeth 32 adapted to mesh with jaw clutch teeth 34 on the second speed drive member 12.

The jaw clutch member 26 is in the form of a sleeve encircling a hub member 11 having external splines 15, and the clutch teeth 28 are in the form of internal splines meshing with the splines 15 to form an axially shiftable connection between the sleeve 26 and the hub 11. The hub 11 in turn is splined as at 13 to the driven shaft 14.

In order to facilitate the automatic shift between the two drive positions, the neutral position of the clutch sleeve 26 is remote from the direct drive position and adjacent the second speed position. In Fig. 1 which shows the coupling in the neutral position, it may be noted that the clutch teeth 34 are carried on the end of an extended neck portion 36 of the driving member 12, which neck portion has an external diameter somewhat less than the base diameter of the clutch teeth 34, and that in the neutral position the neck portion 36 bridges the clutch teeth 32. Likewise, the clutch teeth 32 are carried on an extended neck portion 37 of the clutch sleeve 26, which neck portion is adapted to bridge the clutch teeth 34 in the neutral position. In passing to the direct drive position, the clutch teeth 32 will pass through the clutch teeth 34.

A direct drive synchronizer 42 is adapted to synchronize the clutch sleeve 26 to the clutch teeth 30 in the upshift from second speed to direct drive, and a second speed synchronizer 38 is adapted to synchronize the clutch sleeve 26 to the teeth 34 in the downshift from direct drive to the second speed position. Each of these synchronizers comprises a synchronizer ring 92 encircling a flanged extension 94 of the respective driving member and confined axially between a radial face 93 of the respective driving member and a washer 95 which in turn is abutted against a snap ring 96 mounted in the flange 94. Each synchronizer ring 92 is formed with peripheral synchronizer teeth 97 adapted to be aligned with the adjacent teeth 30 or 34, and with internal ratchet teeth 98 which are adapted to be engaged by spring pawls 99 mounted on the respective flanges 94. The ratchet teeth 98 are so arranged that when positively engaged by the pawls 99 they will position the synchronizer teeth in alignment with the adjacent teeth 30 or 34.

The second speed synchronizer 38 is adapted to become positively engaged when driving member 12 tends to rotate behind the driving member 12 and the direct drive synchronizer 42 becomes positively engaged when the direct drive member 10 tends to rotate slower than the clutch sleeve 26.

The hub 11 is confined in an axially fixed position between snap rings 48 and 50 mounted in the driven shaft 14. A poppet ball 54, mounted in a well 56 in the hub 11, is urged by a spring 52 into engagement with the interior of the sleeve 26, and is adapted to have latching engagement in a recess 58 in the sleeve 26, to establish the second speed position, or a recess 59 in the sleeve 26, to establish the direct drive position. The ball 54 is adapted to yield against the resistance of the spring 52 to permit the sleeve 26 to be shifted torque responsively.

For manually shifting the clutch sleeve 26 from the neutral position, shown in Fig. 1, to the second speed position, shown in Fig. 2, we provide an annular channel 76 in the sleeve 26 and a fork 60, engaged in the channel 76 and connected to suitable manual control mechanism.

For torque responsive shifting of the clutch sleeve 26, we provide a pair of torque responsive devices 46 and 47 respectively including left and right hand peripheral threads 49 formed on the clutch member 26 at the respective ends thereof, and retractable members 62 having thread sections 53 adapted to be projected into meshing engagement with the threads 49 to render the torque responsive mechanism operative, or to be disengaged from the threads 49 to render the torque responsive mechanism inoperative.

The retractable members 62 are in the form of plungers mounted in bearings 64 in the transmission housing 66, each plunger having at its outer end a cam recess 68 in a head 70. Each plunger 62 is controlled by a lever 72 secured to a cam member 74 which is rotatable in the bearing 64 and has at its inner end a cam 75 adapted to engage in the cam recess 68. A spring 77 is compressed between the head 70 of each plunger 62 and a shoulder 78 in the bearing 64, and serves to yieldingly bias the plunger 62 toward its retracted position. The plungers 62 are moved to operative positions by oscillation of the cam members 74 to force the cams 75 out of the recesses 68 and against the flat end surfaces of the heads 70.

Any suitable manual control mechanism for operating the levers 72 may be employed. For example, the lever 72 of the torque responsive mechanism 46 could be arranged to be operated by movement of the engine throttle control member to its fully retracted position in the throttle closing direction, and the lever 72 of the torque responsive mechanism 47 could be arranged to be connected to the throttle control member in such a manner as to render the torque responsive device 47 operative when the accelerator control is moved to or beyond its full throttle position. However, independent manual control could be employed if desired.

In the operation of the transmission, beginning with the neutral position shown in Fig. 1, a shift to the second speed position shown in Fig. 2 may be made simply by shifting the yoke 60 to the left as viewed in the drawings, so as to bring the clutch teeth 32 into mesh with the clutch teeth 34.

The upshift from second speed position to direct drive is effected by closing the engine throttle and simultaneously operating the control for the torque responsive device 46 to engage the teeth 53 with the left hand thread 49 thereof, and such engagement, in connection with the forward rotation of the thread 49, will cause the sleeve 26 to advance toward the direct drive member 10, forcing the poppet ball 54 out of the recess 58 and meshing the teeth 28 with the synchronizer teeth 97 of the direct drive synchronizer 42. The ring 92 of the synchronizer 47 will then rotate with the sleeve 26, while the drive member 10 decelerates, and when the latter commences to rotate slower than the sleeve 26, the synchronizer 42 will engage positively, aligning the teeth 97 with the teeth 30 and permitting the teeth 28 to slide smoothly into mesh with the teeth 30. The poppet ball 54 will then engage in the recess 59, latching the sleeve 26 in the direct drive position of Fig. 4. As the direct drive position is reached, the thread 49 will rotate out of mesh with the partial threads 53 of the plunger 62, discontinuing the torque responsive action.

In the downshift from direct drive to second speed the engine throttle is opened and the control for the torque responsive device 47 is simultaneously manipulated to mesh the teeth 53 with the right hand thread 49 thereof, whereupon the sleeve 26 will be drawn to the right, the synchronizer 38 ratcheting until the speed of the drive member 12 has been increased to that of the clutch member 26, whereupon the synchronizer 38 will establish positive engagement, lining up the synchronizer teeth 97 with the clutch teeth 34 and permitting the clutch teeth 32 to slide smoothly into engagement with the teeth 34. Second speed ratio will thus be established, and the thread 49 will have rotated out of mesh with the partial threads 53 of the torque responsive coupling 47.

The coupling may be shifted back to the neutral position by retracting both of the plungers 62 and then manually shifting the yoke 60 to the right.

In the form of the invention shown in Figs. 8 to 13 inclusive, the drive members 10a and 12a respectively are formed with flanges 17 encircling and spaced radially outwardly from the clutch members 30a and 34a respectively, the latter having internal clutch teeth instead of the external clutch teeth of the previously described form of the invention. The synchronizer rings 92a are accommodated in annular recesses between the flanges 17 and the clutch members 30a and 34a respectively, each synchronizer ring having a plurality of internal recesses 100 in which driving balls 102 are adapted to engage. The clutch members 30a and 34a each have recesses 104 normally receiving the balls 102. Each recess 104 has a ramp surface 106 adapted to cam a driving ball 102 outwardly into a recess 100, so as to establish positive coupling engagement of the synchronizing devices. Each synchronizer ring 92a is provided with internal teeth 97a adapted to be aligned with the clutch teeth 30a, 34a when the synchronizers engage positively.

The shiftable clutch sleeve 26a is splined at 15a to the driven shaft 14a, and has external clutch teeth 28a and 32a respectively adapted for clutching engagement with the teeth 30a and 34a respectively.

The two torque responsive devices 46a and 47a respectively each comprises helical spline type threads 49a on the periphery of the clutch 26a and a sleeve member 19 having internal threads meshing with the threads 49a. Each sleeve member 19 is formed with a drum portion 21 journalled on a respective flange member 17 through the medium of bearing rollers 23 and carrying on its periphery a brake ring 25. An end bearing 17a is interposed between the end of each flange 17 and the corresponding drum portion 21.

The torque responsive couplings 46a and 47a are made operative by braking their respective sleeve members 19. For this purpose, we provide brake shoes 27 adapted to engage the respective brake rings 25. The shoes 27 are independently controlled in a manner similar to that described in connection with the other form of the invention.

For locking the clutch sleeve 26a in its respective positions, we provide a locking ring 61 encircling the sleeve member 19 of the torque responsive coupling 46a, and adapted to hold a locking element 54a, (caged in a bore 56a in the sleeve member 19) in engagement with any one of three recesses 58a, 59a or 57 in the splined periphery of the sleeve 26a. The springs 63 mounted in bores 65 in the collar 61, are compressed between the collar 61 and the drum portion 21 of the torque responsive coupling 46a, and function to constantly bias the collar 61 toward a locking position in which the locking elements are forced into a recess 57, 58a or 59a as previously stated. The collar 61 is adapted to be engaged by a lever 72a for moving it from this locking position to a position wherein an internal recess 73 therein registers with the locking element 54a to permit the latter to be released from a recess 57, 58a or 59a. Engagement of the locking element 54a in the recess 57 establishes the neutral position. Engagement of the locking element in the recess 58a establishes second speed position and engagement in the recess 59a establishes direct drive position.

The operation of the form of the invention just described is similar to that of the previously described form of the invention with the exception that the locking is positive, and a separate control is provided for unlocking. This control is preferably coordinated with the control for the torque responsive coupling 47a in such a manner that both controls will be made operative simultaneously upon moving the throttle control member to full throttle position or beyond.

While we have herein referred to the movable clutch means as being torque responsive, at least insofar as the elements 46 and 46a are concerned, it is understood that movements of the clutches, in the respective forms shown, are responsive to torque action in the sense that when properly engaged they will be actuated by torque. Thus each is torque actuated by engagement of the rotating clutch, in the manner disclosed by stationary means, whereby the torque action causes the shifting operation.

We claim:

1. In a positive coupling, the combination of first and second members rotatable relative to each other, a third member rotatable relative to said first and second members, a coupling member adapted for positive coupling connection with either of said first or second members and having an axially shiftable driving connection with said third member, said coupling member having a neutral position in addition to its positive coupling positions, means selectively operable to be effective upon rotation of said coupling member for causing shifting of the coupling member into one of its positive coupling positions, means selectively operable to be effective upon rotation of said coupling member for causing shifting of the coupling member into the other of its positive coupling positions, and operator controlled means for shifting said coupling member from its neutral position to one of its coupling positions.

2. In a positive coupling, the combination of first and second members rotatable relative to each other, a third member rotatable relative to said first and second members, a coupling member adapted for positive coupling connection with either of said first or second members and having an axially shiftable driving connection with said third member, means selectively operable to be effective upon rotation of said coupling member for causing shifting of the coupling member into one of its positive coupling positions, and means selectively operable to be effective upon rotation of said coupling member for causing shifting of the coupling member into the other of its positive coupling positions, said two last named means including threads of opposite hand formed on said coupling member.

3. In a positive coupling, the combination of first and second members rotatable relative to each other, a third member rotatable relative to said first and second members, a coupling member adapted for positive coupling connection with either of said first or second members and having an axially shiftable driving connection with said third member, means selectively operable to be effective upon rotation of said coupling member for causing shifting of said coupling member into one of its positive coupling positions and adapted to be selectively rendered operable, and means selectively operable to be effective upon rotation of said coupling member for causing shifting of the coupling member from its said first named coupling position into the other of its positive coupling positions, said shifting means comprising threads of opposite hand formed on said coupling member and devices coacting with the respective threads and adapted to be independently moved into mesh with the respective threads.

4. In a positive coupling, the combination of first and second members rotatable relative to each other, a third member rotatable relative to said first and second members, a coupling member adapted for positive coupling connection with either of said first or second members and having an axially shiftable driving connection with said third member, means selectively operable to be effective upon rotation of said coupling member for causing shifting of the coupling member into one of its positive coupling positions, and means selectively operable to be effective upon rotation of said coupling member for causing shifting of the coupling member from said last named coupling position into its other positive coupling position, said two shifting means comprising threads of opposite hand formed on said coupling member and threaded members coacting with said threads and in constant mesh therewith, said coacting threaded members being adapted for free rotation with said respective sets of threads, and means for independently braking said coacting members for shifting the coupling member.

5. In a positive coupling, the combination of first and second members rotatable relative to each other, a third member rotatable relative to said first and second members, a coupling member adapted for positive coupling connection with either of said first or second members and having an axially shiftable driving connection with said third member, said coupling member having in addition to its two positive coupling positions a neutral non-coupling position adjacent to one of its positive coupling positions and remote from the other, means selectively operable to be effective upon rotation of the coupling member for causing shifting of the coupling member from one of its positive coupling positions into the other of its positive coupling positions, means selectively operable to be effective upon rotation of said coupling member for causing shifting of the coupling member from its last named positive coupling position into the other to its positive coupling positions, and operator releasable means for automatically locking said coupling member in either of its positive coupling positions or in its said neutral position.

6. In a positive coupling, the combination of first and second members rotatable relative to each other, a third member rotatable relative to said first and second members, a coupling member adapted for positive coupling connection with either of said first or second members and having an axially shiftable driving connection with the third member, said coupling member having in addition to its two positive coupling positions a neutral non-coupling position adjacent to one of its coupling positions and remote from the other, means selectively operable to be effective upon rotation of said coupling member for causing shifting of the coupling member from one of its coupling positions into the other, means selectively operable to be effective upon rotation of said coupling member for causing shifting of the coupling member from its last named positive coupling position into its other positive coupling position, operator releasable means for automatically locking said coupling member in either of its positive coupling positions or in its said neutral position, and operator controlled means coupled directly to said coupling member for shifting the same from its neutral position to the adjacent positive coupling position.

7. In a positive coupling device, the combination of a pair of relatively rotatable members, a coupling member adapted for positive coupling connection with one of said members and having an axially shiftable driving connection with the other, and means selectively operable to be effective upon rotation of said coupling member for causing shifting of the member into its positive coupling position, said shifting means including a thread formed on the coupling member and a member coacting with said thread, and operator controlled means for shifting said last named member into and out of mesh with the thread.

8. In a positive coupling device, the combination of a pair of relatively rotatable members, a coupling member adapted for positive coupling connection with one of said members and having an axially shiftable driving connection with the other, means selectively operable to be effective upon rotation of said coupling member for causing shifting of the coupling member into its positive coupling position, said shifting means including a member having a threaded connection with said coupling member and normally freely rotatable with the coupling member and means for braking said normally freely rotatable member, and means for locking said coupling member and comprising a locking collar carried by said normally freely rotatable member, a locking element caged in said normally freely rotatable member and adapted for locking engagement with said coupling member, means constantly biasing said locking collar to a position wherein it will hold said locking element in said locking engagement, and means for shifting said collar to a position wherein it permits said locking element to be released from said locking engagement.

HAROLD E. CARNAGUA.
CLIFFORD L. SWIFT.